(12) United States Patent
Bianchetto

(10) Patent No.: US 6,170,855 B1
(45) Date of Patent: Jan. 9, 2001

(54) WEB ROLL CART

(75) Inventor: Peter E. Bianchetto, Foxboro, MA (US)

(73) Assignee: Roll Systems, Inc., Burlington, MA (US)

(*) Notice: Under 35 U.S.C. 154(b), the term of this patent shall be extended for 0 days.

(21) Appl. No.: 09/168,552

(22) Filed: Oct. 8, 1998

(51) Int. Cl.$^7$ ....................................................... B62B 3/02
(52) U.S. Cl. ............... 280/651; 280/47.315; 280/47.371; 280/79.6
(58) Field of Search ........................... 280/33.994, 47.24, 280/47.315, 655, 640, 47.34, 47.17, 651, 659, 43.12, 43.22, 46.26, 47.35, 47.36, 47.16, 79.3, 79.6, 79.11; D34/12, 17; 292/108, 210, 338; 414/664; 403/101, 99

(56) References Cited

U.S. PATENT DOCUMENTS

| | | | |
|---|---|---|---|
| D. 346,252 | * 4/1994 | Jones et al. | D34/23 |
| 882,296 | * 3/1908 | Carroll | 292/210 |
| 1,210,826 | * 1/1917 | Minor | 292/210 |
| 1,930,078 | * 10/1933 | Bentley et al. | 280/61 |
| 2,133,010 | * 10/1938 | Barry | 74/551.1 |
| 2,791,437 | * 5/1957 | Knarzer | 280/47.36 |
| 3,481,123 | * 12/1969 | Lessig | 56/25.4 |
| 4,240,773 | * 12/1980 | Terry | 414/664 |
| 4,458,906 | * 7/1984 | Lamson | 280/47.34 |
| 4,561,239 | * 12/1985 | Cook | 56/320.1 |
| 5,253,972 | * 10/1993 | Drew et al. | 414/469 |

* cited by examiner

Primary Examiner—J. J. Swann
Assistant Examiner—J. Allen Shriver
(74) Attorney, Agent, or Firm—Cesari and McKenna, LLP; William A. Loginov

(57) ABSTRACT

A web roll cart for loading, unloading, and transporting rolls of web material wherein a handle may be pivoted between two different orientations, regardless of the presence of a roll of web material thereon. The two handle orientations permit the cart to be steered from either of two sides, and further permits a roll of web material to be presented to a web handling device in either of two orientations. A locking mechanism is provided so that the handle may be locked securely in either orientation while the cart is being steered. In a preferred embodiment, the web roll cart further includes four wheels, with two of the four wheels on casters for steering, and a v-shaped bed for receiving a roll of web material.

13 Claims, 6 Drawing Sheets

WEB ROLL CART

FIELD OF INVENTION

This invention relates to the handling of web material for use with web utilization devices. More particularly, this invention relates to a web roll cart for transferring rolls of web material to, from and between such devices.

BACKGROUND OF THE INVENTION

There are a variety of web handling devices, including impact printers, bursters, collators, inserters and the like. These devices operate on a continuous sheet of web material fed to and/or from a large roll of web material. While web handling devices work quite well, it is difficult to handle the rolls of web material upon which they operate. A web roll cart is used to transport rolls of web material. A typical prior art roll cart 10 is shown in FIG. 1. The bed 12 of the web roll cart 10 includes a v-shaped portion 14 formed from a sheet material such as steel for receiving a large roll of web material (not shown). The bed 12 is supported by four wheels including two rear wheels 16 and is two front wheels 18. The front wheels 18 typically include casters 20 rotatably attached to the bed 12 to permit steering of the web roll cart 10. The web roll cart 10 also includes a handle 22 with two upright arms 24 and a gripping portion 26 which an operator uses to manipulate the web roll cart 10. Due to the weight of typical rolls of web material, the arms 24 are reinforced with metal fillets 28 attached between the arms 24 and the bed 12 by welding or other well known securing techniques.

Web rolls typically weigh between 400–800 pounds or more. Due to their weight and large size, it is difficult to transport them without damaging the outer layers of web material. Further, due to their circular cross section, the rolls must sometimes be secured in position when unattended or while being transferred between locations.

A particular problem arises when transferring rolls between two web handling devices. Web handling devices are typically end-loaded, in the sense that a roll of web material is presented to the device along the axis of web feeding. A wheeled cart with a handle for pushing is typically provided for this task, with an operator wheeling the cart into the web handling device from one end. In this operation, the roll is bounded on all sides, i.e., by the web handling device on the back and top, by the floor on the bottom, by the roll mounting chucks and arms on each side, and by the wheeled cart's handle on the front. Due to the space constraints created by the web handling device and its chucks, the wheeled cart will have a specific loading end and a handling end which includes an elongated handle so that an operator can direct the roll into position free from interference. This is adequate for a single loading or unloading operation. However, when a roll is transferred between devices, the orientation of the roll must sometimes be changed so that the loading end of the cart presents a roll oriented to feed from the top instead of the bottom, or vice versa.

Accordingly, it is an object of the invention to provide a bidirectional web roll cart, i.e., a device which can present a web roll to a web handling device in either of two possible orientations while providing a handle for operator manipulation. The web roll cart should also provide for easy transportation of web rolls, in a manner which prohibits uncontrolled motion of the web rolls.

SUMMARY OF THE INVENTION

To accomplish the foregoing and other objects, features, and advantages of the invention there is provided a web roll cart for loading and unloading rolls of web material, and for transporting rolls of web material to and from web handling devices that enables a user to easily switch between two handle orientations at selected times regardless of the presence (or absence) of a roll thereon. The invention further provides a locking mechanism such that the handle will be held securely in either orientation while a web roll is being transported.

In the preferred embodiment, the web roll cart includes four wheels, with two of the wheels mounted with casters to permit the roll cart to be steered. The web roll cart further includes a pivotally mounted handle which may be swung over the top of the web roll and locked into position on either side of the web roll, thus permitting an operator to s steer the cart from either of two sides, and more particularly permitting an operator to present the web roll to a web handling device in either of two orientations.

The web roll cart can also include a v-shaped upper surface for securely receiving a roll of web material having a circular cross section. The web material may be paper or may be other forms of web material generally used in a web handling device, and the web roll may weigh 400–800 pounds or more.

BRIEF DESCRIPTION OF THE DRAWINGS

The invention description below refers to the accompanying drawings, of which.

DETAILED DESCRIPTION

The web roll cart of the present invention can be used with a web handling apparatus adapted to supply web material as might be fed into, for example, a laser printer. One of the substantial improvements relates to the web roll cart's pivoting and locking handle, which permits bidirectional loading and unloading of web rolls. As further ad- vantages, the present invention provides caster wheels for steering and a v-shaped bed for securely engaging a roll of web material.

Figure 1:
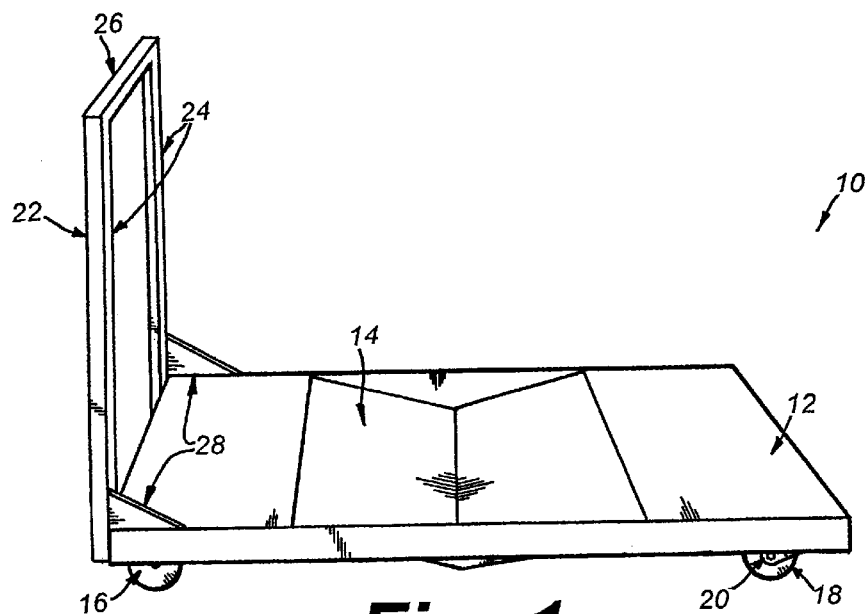
FIG. 1 is perspective view of a prior art web roll cart.
Figure 2:
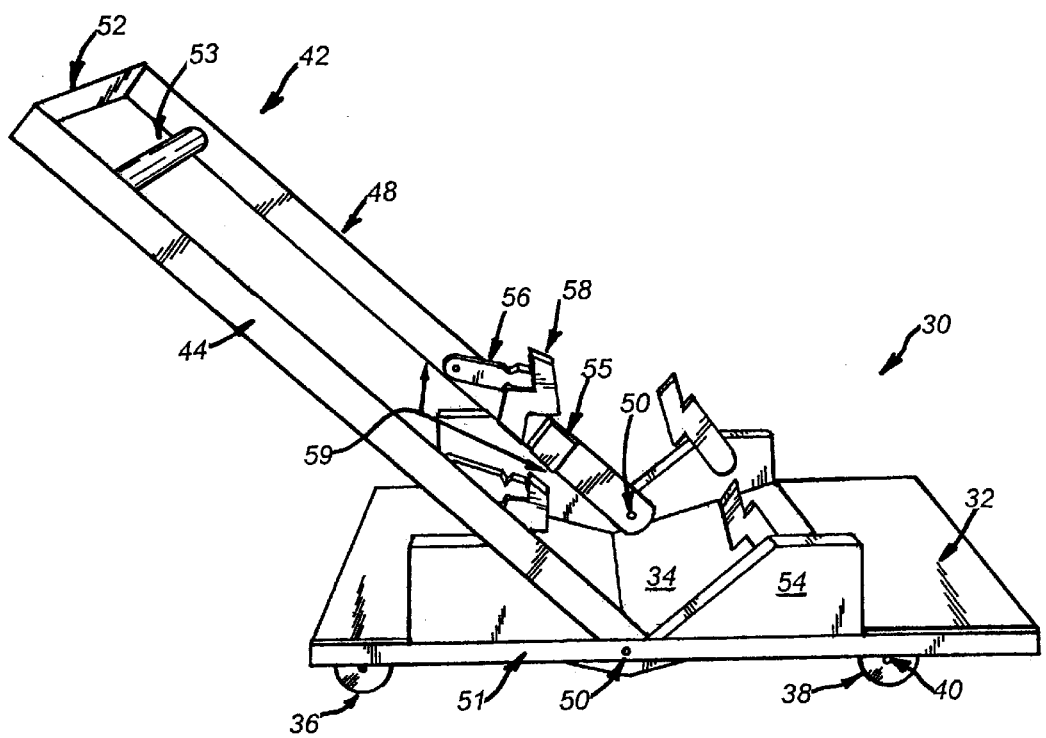
FIG. 2 is a perspective view of the web roll cart of the present invention.

The web roll cart 30 of the present invention is shown in FIG. 2. As in the prior art, the web roll cart 30 includes a bed 32 with a v-shaped portion 34 for securely engaging a roll of web material. The web roll cart 30 also includes two wheels on each end 36, 38. One pair of wheels 38 are rotatably attached using casters 40 to permit steering of the web roll cart 30. Alternatives to casters may be used, such as ball-bearing fixtures, roller- bearing fixtures, or other rotatable mountings, provided they permit the web roll cart 30 to be steered under the weight of a roll of web material.

The handle 42 of the present invention has two arms 44, 48, each arm being rotatably mounted to the bed 32 by a pivot 50 near the center of the v-shaped portion 34 of the bed 32. The pivot 50 may be formed from a metal rod or dowel of appropriate diameter passing through a bed sidewall 51 and the handle 42. The handle 42 also includes a gripping portion 52 and a hand guard 53 which protects the hands of an operator from being trapped between an object, such as a roll of web material, and the gripping portion 52. The guard 53 also provides additional structural support to the handle 42. On each side of the bed 32, a handle support 54 is mounted. The handle support 54 defines the range of motion in which the pivoting handle 42 may travel. Each arm 44, 48 includes a block 55 to support the handle 42 on either of the two handle supports 54. The block 55 on each arm 44, 48 also acts in conjunction with a latch 56 and a gravity lock 58 to securely lock the handle 42 in either of two fully pivoted positions. The locking mechanism 59, formed by the block 55, the latch 56, and the gravity lock 58, is explained in greater detail below.

Figure 3:
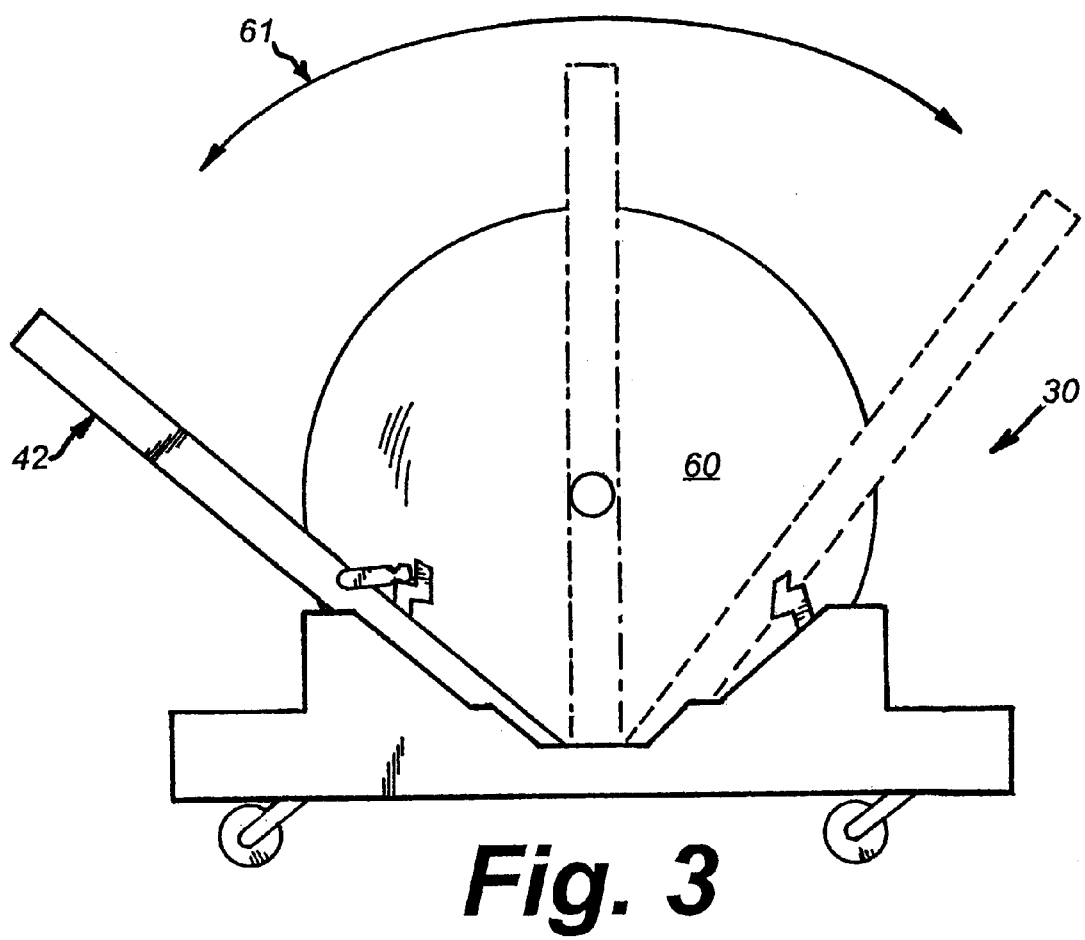
FIG. 3 is a schematic side view of the pivoting handle of the present invention.

Referring briefly to FIG. 3, the handle 42 can be seen pivoting over the top of a roll of web material 60 from a first position on the left to a second position on the right.

A double arrow 61 indicates the direction of the motion of the handle 42 about the pivot 50. Through this pivoting motion, the roll of web material 60 may be presented to a web handling device in either of two orientations without removing the roll of web material 60 from the web roll cart 30.

Figure 4:
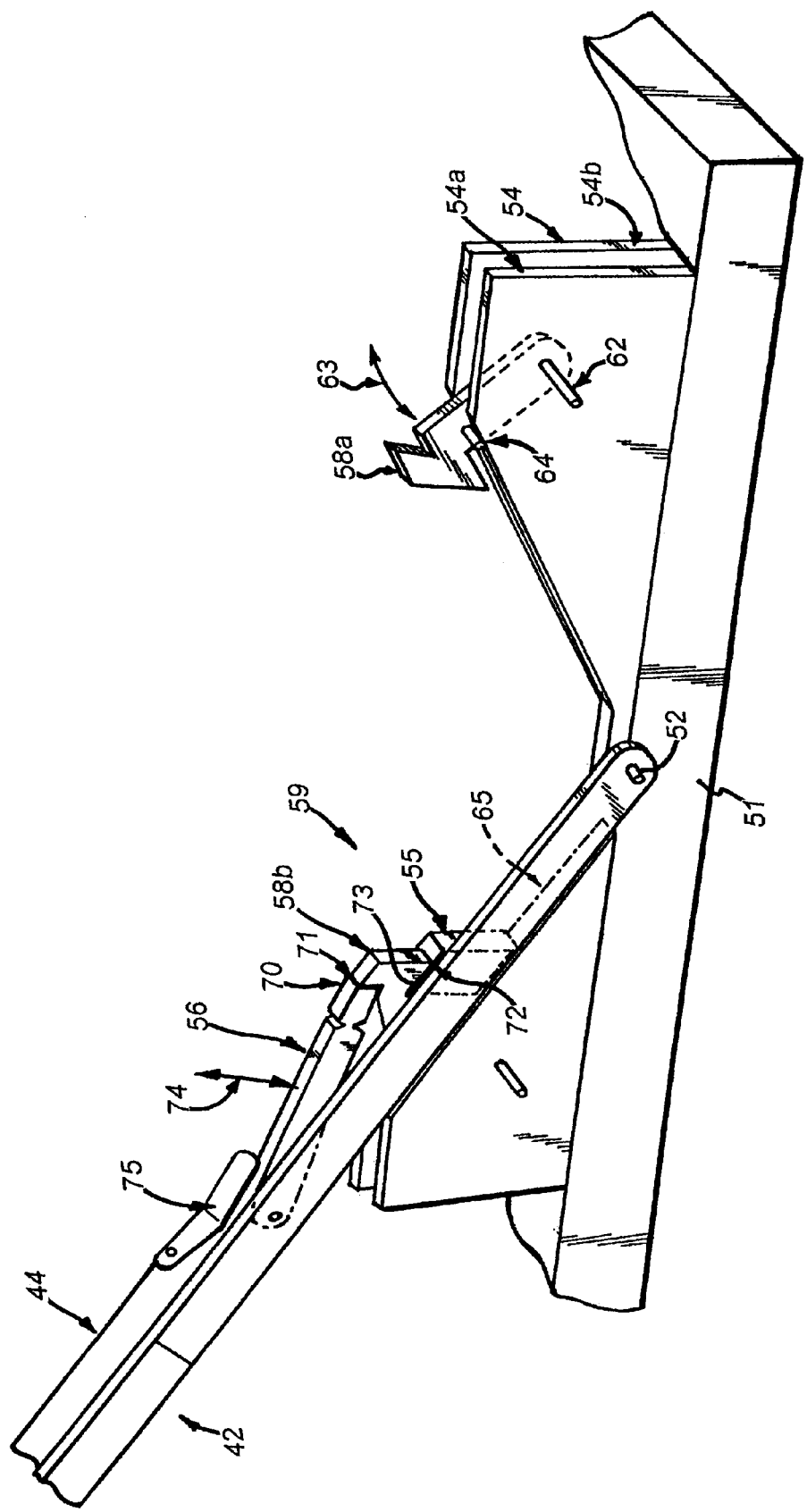
FIG. 4 is a perspective view of the locking mechanism of the present invention.

The locking mechanism 59 will now be described with reference to FIG. 4. The right hand portion of FIG. 4 shows a first gravity lock 58a. The handle support 54 has two parallel plates, an outer plate 54a and an inner plate 54b. The gravity lock 58a is pivotally mounted by a dowel 62 between the two plates 54a, 54b, so that the gravity lock 58a can rotate about the dowel 62 as indicated by an arrow 63. It should be appreciated that a number of pivotal mountings can be employed, including screws, bolts, pins, rivets, or more complex structures such as cylinders mounted on wheel or roller bearing assemblies. Any such mounting may be used, provided it permits the gravity lock to rotate freely in the plane of the two parallel plates 54a, 54b. A second dowel 64 prevents the freely swinging gravity lock 58a from falling completely into the space between the two parallel plates 54a, 54b, so that the top portion of the gravity lock 58a always remains exposed. The second dowel 64 should be wide enough to engage the parallel plates 54a, 54b on each side.

The left hand portion of FIG. 4, shows the handle 42 in a locked position. The arm 44 of the handle 42 is held in position by the gravity lock 58b, which is secured between the block 55 of the arm 44 and the latch 56 of the arm 44. In this position, the handle 42 is prevented from pivoting counterclockwise by the block 55, which rests upon the top surface 65 of the parallel plates 54a, 54b. The handle 42 is simultaneously prevented from pivoting clockwise by the latch 56, which has a locking surface 70 abutting an upper matching surface 71 of the gravity lock 58b. The handle is also prevented from pivoting clockwise by the block 55, which has a locking surface 72 abutting a lower matching surface 73 of the gravity lock 58b. The latch 56 is pivotally mounted so that it may rotate away from the gravity lock 58b, along the arc indicated by an arrow 74, to unlock the handle, and also so that it may rotate into a position for engaging the other gravity lock 58a. A leaf spring 75 prevents the latch 56 from disengaging during use or due to external vibration. The leaf spring 75, and an additional leaf spring (not shown) on the opposing side of the handle also operate to keep the latch 56 centered when the handle 42 is not locked on either side. This dual centering and locking function of the spring can be achieved by any other commonly known spring mechanisms.

Figure 5:
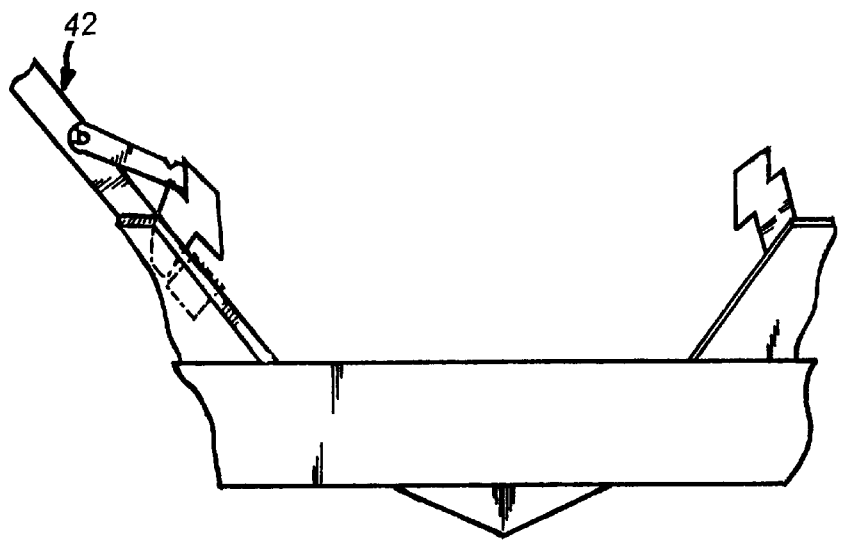
FIGS. 5–8 are schematic side views showing the unlocking operation of the locking mechanism.
Figure 6:
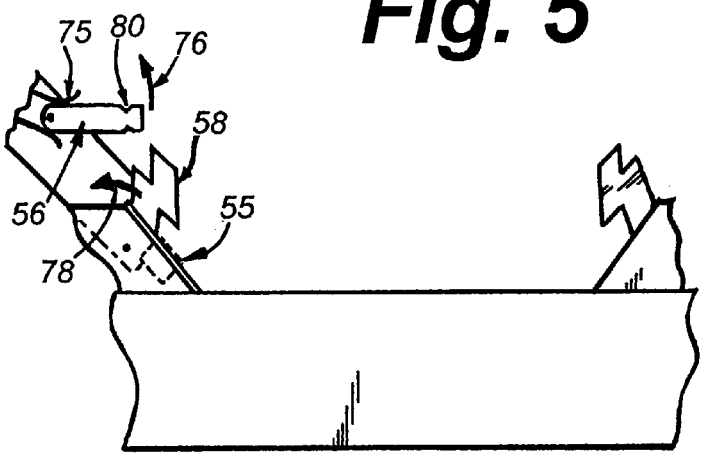
Figure 7:
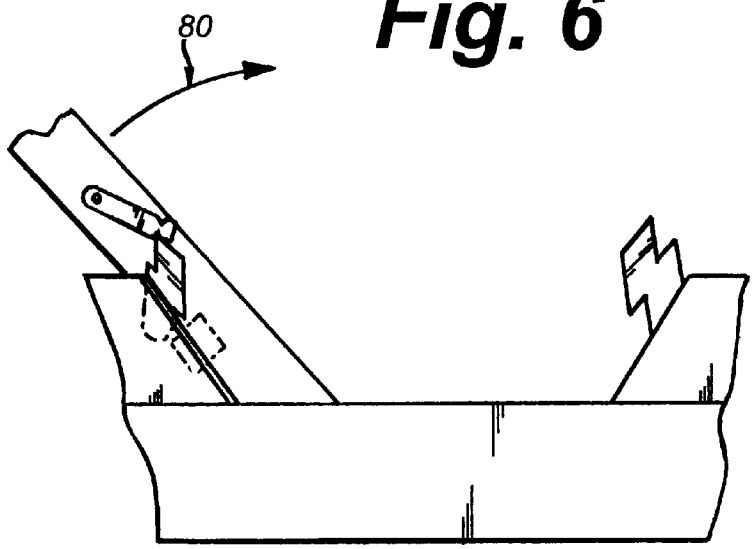

Refer now to FIGS. 5–8, which show the steps necessary to unlock the handle 42 from its secured position. FIG. 5 shows the handle 42 in its locked position as described above. In FIG. 6, the latch 56 is rotated upward, as shown by an arrow 76, to permit free motion of the gravity lock 58. Even with the latch 56 rotated upward, The force of gravity will cause the gravity lock 58 to remain engaged with the block 55. At this point, the operator must manually rotate the gravity lock 58 up (and counterclockwise) away from the block 55, as shown by an arrow 78. Each latch includes two disengaging notches for securing the gravity lock 58 in this intermediate position. One of the notches 80, in conjunction with the force of a leaf spring 75, operate to loosely secure the gravity lock in this disengaged position, as shown in FIG. 7. Once the gravity lock 58 of the first arm 44 (FIG. 2) is so secured, an operator can proceed to disengage and secure the gravity lock 58 of the second arm 48 (FIG. 2) in the same manner.

Figure 8:
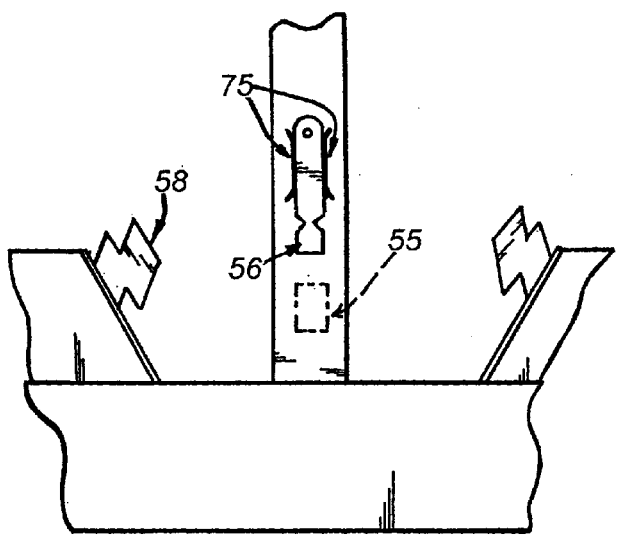

With both of the gravity locks disengaged as shown in FIG. 7, the handle 42 may be freely rotated clockwise into a neutral position along the path indicated by the arrow 80. FIG. 8 shows the handle in a neutral position. In this position, the gravity locks 58 on the left side will rotate forward (clockwise) such that they are ready to be re-engaged by is the latch 56 and the block 55 on each arm 44, 48 of the handle 42. At the same time, the opposing leaf springs 75 operate to keep the latch 56 centered approximately in line with the handle 42 until the next locking operation. By approximately in line, it is meant that the latch 56 is aligned such that it will initially engage the gravity lock 58 at a correct angle during the locking procedure illustrated in FIGS. 6–7.

Figure 9:
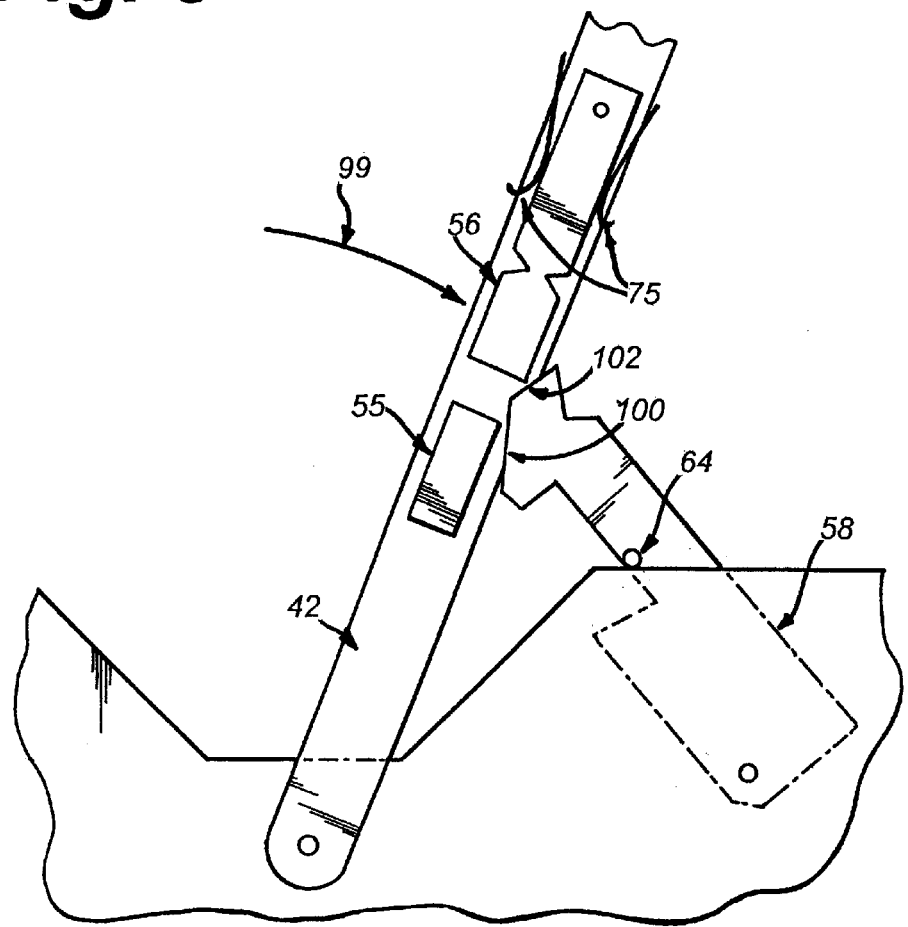
FIGS. 9–11 are schematic side views showing the locking operation of the locking mechanism.
Figure 10:
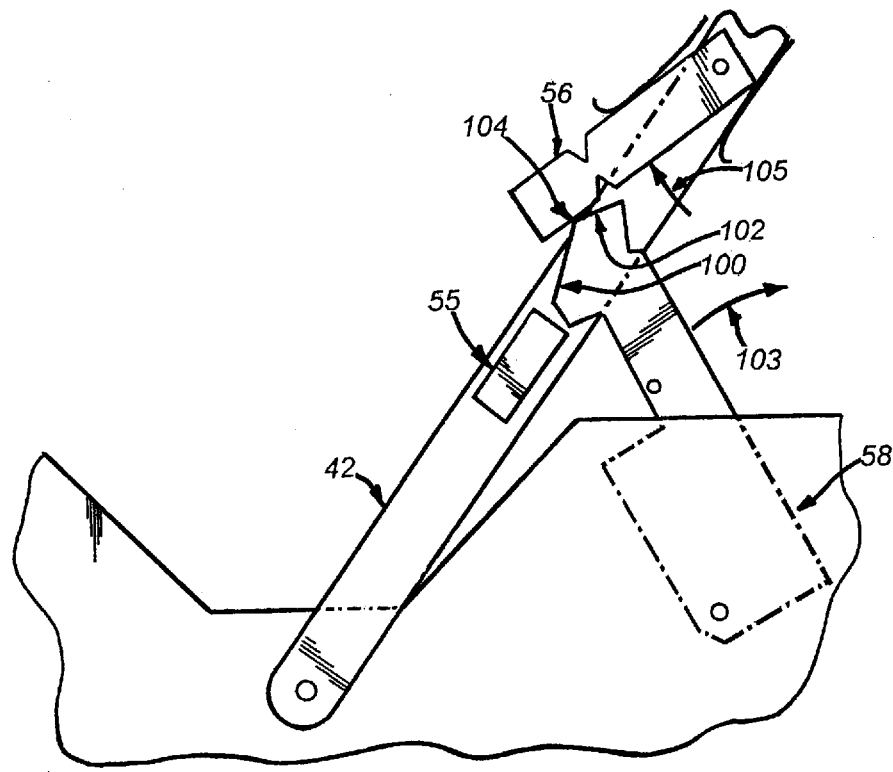
Figure 11:
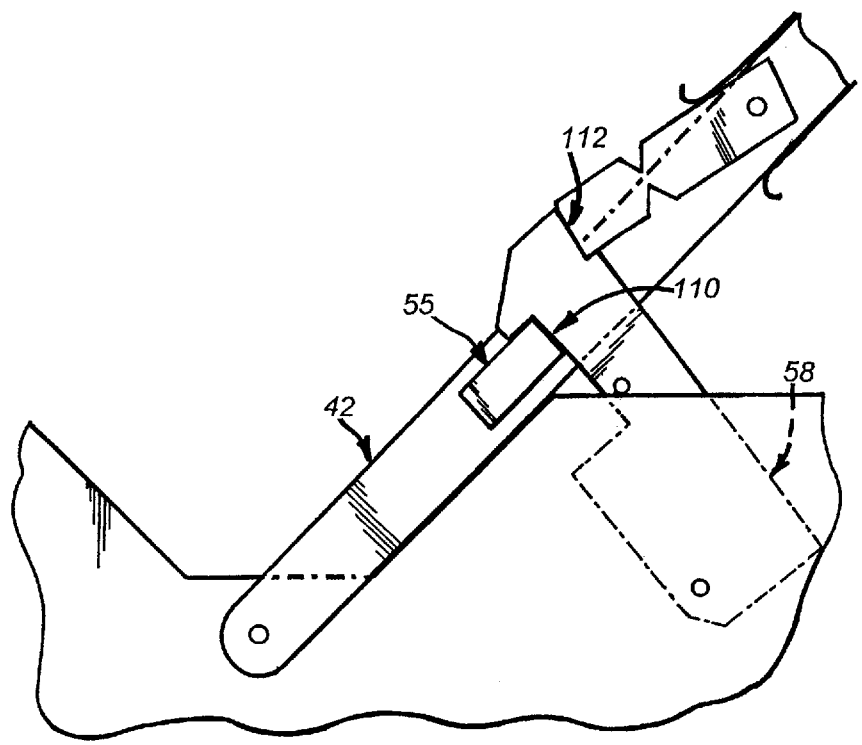

FIGS. 9–11 show how each arm 44, 48 of the handle 42 locks into its secured position. Initially, the gravity lock 58 is supported in the proper attitude by a dowel 64. As shown in FIG. 9, the handle 42 is rotated (clockwise) along the path indicated by the arrow 99 until the block 55 engages the gravity lock 58 on a lower front edge 100. At the same time, the latch 56 engages the gravity lock 58 on an upper front edge 102. The continued clockwise motion of the handle 42 initiates two separate motions in the locking mechanism. As shown in FIG. 10, the force of the block 55 on the lower front edge 100 of the gravity lock 58 causes the gravity lock 58 to lift and rotate clockwise along the path indicated by the arrow 103. At the same time, a corner 104 between the lower front edge 100 and the upper front edge 102 of the gravity lock pushes against the latch 56 causing the latch to rotate against the restraint of the leaf spring 75, as indicated by the arrow 105. As shown in FIG. 11, the handle 42 finally travels sufficiently far for the block notch 110 of the gravity lock 58 to receive the block 55. At this point the gravity lock 58 will rotate forward and engage, in the latch notch 112 on its opposing side, the latch 56. The block 55 also engages the handle support 54 to prevent further clockwise travel of the handle 42.

Having now described various embodiments of the present invention along with certain variations thereof, it should be apparent to those skilled in the art that other modifications and other embodiments will also fall within the scope of the present invention as defined by the following claims. For example, a number of components of the above-described web roll cart 32 are well known and have many known substitutes. The leaf springs 75 referred to above may instead be a coil spring mounted inside of the latch 56 and attached to the handle 42. Likewise the dowel 62 may be a screw, a bolt, a hinge, a rod, a pin, or any other mounting device which permits the gravity lock 58 to rotate freely between the two parallel plates 54a, 54b. Accordingly, the above description is meant to be taken by way of example and not to otherwise limit the scope of this invention.

What is claimed is:

1. A web roll cart comprising:
a base constructed and arranged to support a web roll on the surface thereof, the base having a first end, a second end, a first side, a second side, and an upper surface;
wheels for supporting the base, whereby the base is movable about a floor surface;
a handle comprising a first arm, a second arm, and a crossbar joining an upper end of the first arm to an upper end of the second arm;
a lower end of the first arm being pivotally mounted to a first pivot point on the first side of the base and a lower end of the second arm being pivotally mounted to a second pivot point on the second side of the base;
a first handle support attached to the first side of the base and a second handle support attached to the second side of the base, the first handle support being centered about the first pivot point and the second handle support being centered about the second pivot point;
the first handle support and the second handle support further being arranged to limit a pivoting motion of the handle at a first position and a second position; and
a locking mechanism to secure the handle in either of the first position and the second position, the locking mechanism having a first block on the first arm of the handle, the first block further comprising a first surface and a second surface, a second block on the second arm of the handle, the second block further comprising a first surface and a second surface, a first latch on the first arm of the handle, a second latch on the second arm of the handle, and four gravity locks comprising a first position gravity lock on the first side, pivotally mounted to the first handle support, and a second position gravity lock on the first side, pivotally mounted to the first handle support.

2. The web roll cart of claim 1 further comprising:
a first position gravity lock on the second side, pivotally mounted to the second handle support and opposing the first position gravity lock on the first side;
a second position gravity lock on the second side, pivotally mounted to the second handle support and opposing the second position gravity lock on the first side.

3. The web roll cart of claim 2 further comprising a first one or more springs for maintaining the first latch approximately in line with the first arm of the handle, and a second one or more springs for maintaining the second latch approximately in line with the second arm of the handle, when the handle is free from engagement with any of the s four gravity locks.

4. The web roll cart of claim 3 wherein the first one or more springs comprise two leaf springs and the second one or more springs comprise two leaf springs.

5. The web roll cart of claim 2 wherein:
(A) the first position gravity lock on the first side further comprises a first lower locking surface for engaging the first surface of the first block and a first upper locking surface for engaging a locking surface of the first latch when the handle is locked in the first position;
(B) the first position gravity lock on the second side further comprises a second lower locking surface for engaging the first surface of the second block and a s second upper locking surface for engaging a locking surface of the second latch when the handle is in the first position;
(C) the second position gravity lock on the first side further comprises a third lower locking surface for engaging the second surface of the first block and a third upper locking surface for engaging the locking surface of the first latch when the handle is in the second position; and
(D) the second position gravity lock on the second side further comprises a fourth lower locking surface for engaging the second surface of the second block and a fourth upper locking surface for engaging the locking surface of the second latch when the handle is in the second position.

6. The web roll cart of claim 2 wherein:
(A) the first latch further comprises a first disengaging notch for securing the first position gravity lock on the first side in an intermediate position while the handle is in the first position;
(B) the first latch further comprises a second disengaging notch for securing the second position gravity lock on the first side in an intermediate position while the handle is in the second position;
(C) the second latch further comprises a first disengaging notch for securing the first position gravity lock on the second side in an intermediate position while the handle is in the first position; and
(D) the second latch further comprises a second disengaging notch for securing the second position gravity lock on the second side in an intermediate position while the handle is in the second position.

7. The web roll cart of claim 1 wherein the wheels comprise at least four wheels.

8. The web roll cart of claim 7 wherein at least two of the at least four wheels are mounted on casters.

9. The web roll cart of claim 1 wherein the handle further comprises a guard extending between the first arm and the second arm, oriented parallel to the crossbar and located near the upper end of the first arm and the upper end of the second arm.

10. The web roll cart of claim 1 wherein the base has a v-shaped portion for receiving a roll of web material.

11. The web roll cart of claim 10 wherein the first pivot point and the second pivot point are aligned with a center of the v-shaped portion.

12. A method for changing a location of a handle on a web cart from a first position to a second position, the web cart comprising a base for supporting a web of roll material, the base having a first side and a second side, a first arm of the handle having a lower end pivotally mounted to the base, a second arm of the handle having a lower end pivotally mounted to the base, a first block on the first arm, a second block on the second arm, a first latch on the first arm having a first disengaging notch and a second disengaging notch, a second latch on the second arm having a first disengaging notch and a second disengaging notch, a first position gravity lock on the first side, a first position gravity lock on the second side, a second position gravity lock on the first side, and a second position gravity lock on the second side, and the method comprising:
(A) lifting the first latch from the first position gravity lock on the first side;
(B) lifting the first position gravity lock on the first side from the first block;
(C) lower the first latch, thereby engaging the first position gravity lock on the first side in an intermediate position with the first disengaging notch of the first latch;
(D) repeating steps (A)–(C) with the second latch, the second block, and the first position gravity lock on the second side;

(E) pivoting the handle away from the first position; and (C) pivoting the handle to the second position, thereby engaging the second position gravity lock on the first side with the first latch and the first block, and thereby engaging the second position gravity lock on the second side with the second latch and the second block.

13. A web roll cart comprising:

a base constructed and arranged to support a web roll on the surface thereof, the base having a first end, a second end, a first side, a second side, and an upper surface;

wheels for supporting the base, whereby the base is movable about a floor surface;

a handle comprising an arm, and a bar connected to an upper end of the arm;

a lower end of the arm being pivotally mounted to a pivot point on the first side of the base;

a handle support attached to the first side of the base and being centered about the pivot point;

the handle further being arranged to limit a pivoting motion of the handle at a first position and a second position; and a locking mechanism to secure the handle in either of the first position and the second position, the locking mechanism having a block on the arm, the block further comprising a first surface and a second surface, a latch on the arm of the handle and gravity locks comprising a first position gravity lock on the first side, pivotally mounted to the handle support, and a second position gravity lock on the first side, pivotally mounted to the handle support.

* * * * *